United States Patent [19]

Yi-Yan

[11] Patent Number: 4,747,654

[45] Date of Patent: May 31, 1988

[54] OPTICAL MONOMODE GUIDANCE STRUCTURE INCLUDING LOW RESOLUTION GRATING

[76] Inventor: Alfredo Yi-Yan, 19 rue de la Tombe Issoire, 75014 Paris, France

[21] Appl. No.: 45,162

[22] Filed: May 4, 1987

Related U.S. Application Data

[63] Continuation of Ser. No. 612,316, May 21, 1984, abandoned.

[30] Foreign Application Priority Data

May 19, 1983 [FR] France ............................... 8308298

[51] Int. Cl.$^4$ ............................ G02B 6/34; G02B 5/18
[52] U.S. Cl. ............................... 350/96.19; 350/96.12; 350/96.13; 350/96.14; 350/162.2; 350/162.23
[58] Field of Search ............... 350/96.11, 96.12, 96.13, 350/96.14, 96.15, 96.16, 96.19, 162.17, 162.19, 162.20, 162.22, 162.23

[56] References Cited

U.S. PATENT DOCUMENTS

| | | | |
|---|---|---|---|
| 3,891,302 | 6/1975 | Dabby et al. ..................... | 350/96.19 |
| 3,894,498 | 6/1974 | Tomlinson, III et al. ....... | 350/96.19 |
| 4,148,556 | 4/1979 | Sauter ............................... | 350/96.13 |
| 4,153,329 | 5/1979 | Gillette ............................ | 350/96.13 |
| 4,257,673 | 3/1981 | Matthijsse ...................... | 350/96.19 |
| 4,262,992 | 4/1981 | Berthold, III .................. | 350/96.14 |
| 4,362,359 | 12/1982 | Dammann et al. ............. | 350/96.19 |
| 4,626,069 | 12/1986 | Dammann et al. ........... | 350/96.19 X |
| 4,696,536 | 9/1987 | Albares et al. ................. | 350/96.19 |

FOREIGN PATENT DOCUMENTS

| | | | |
|---|---|---|---|
| 2304935 | 10/1976 | France ............................. | 350/96.13 |
| 2454633 | 11/1980 | France ............................. | 350/96.19 |
| 54-56463 | 7/1979 | Japan ............................... | 350/96.19 |

OTHER PUBLICATIONS

Baets et al., "Calculation of Radiation Loss in Integrated-Optic Tapers and Y-Junctions", Appl. Opt., vol. 21, No. 11, 6/82, pp. 1972–1978.

Primary Examiner—William L. Sikes
Assistant Examiner—Brian M. Healy
Attorney, Agent, or Firm—Oblon, Fisher, Spivak, McClelland & Maier

[57] ABSTRACT

Optical guidance structure comprising a monomode input guide having a particular direction (De), two monomode output guides having directions ($Ds_1$, $Ds_2$) symmetrically inclined with respect to the direction (De) of the input guide and a widened junction zone between the input guide and the output guides. A diffraction grating is located between the input guide and the junction. The grating has a spacing which defines only two diffraction directions of orders differing from zero, respectively +1 and −1. The spacing is chosen so that these two diffraction directions coincide with the directions of the first two output guides.

11 Claims, 6 Drawing Sheets

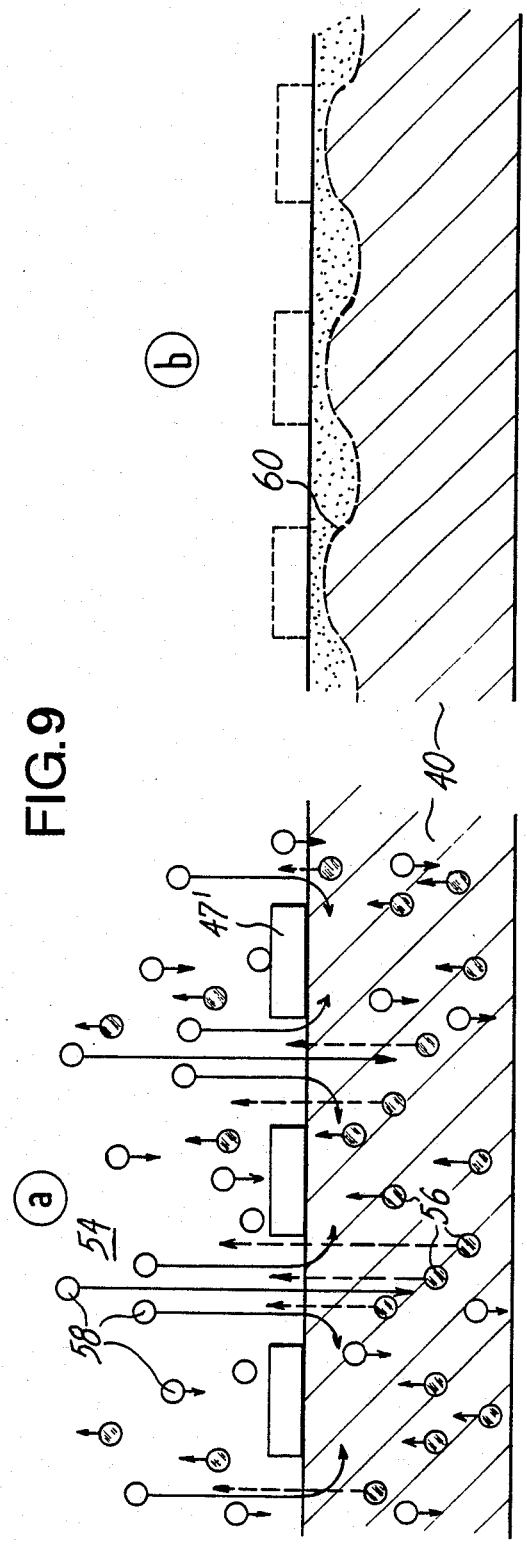

FIG.10
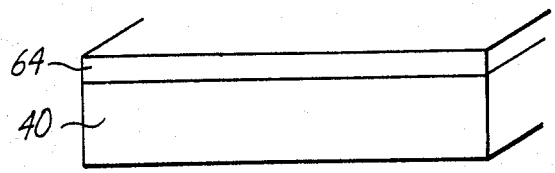
(a)
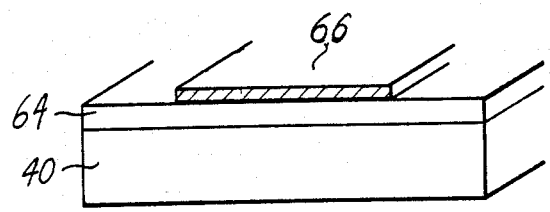
(b)
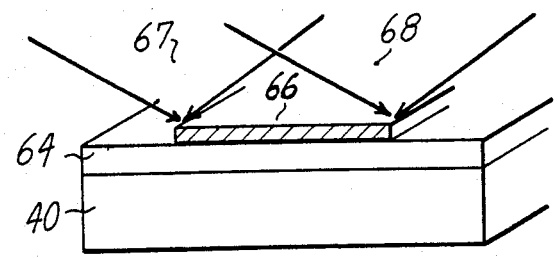
(c)
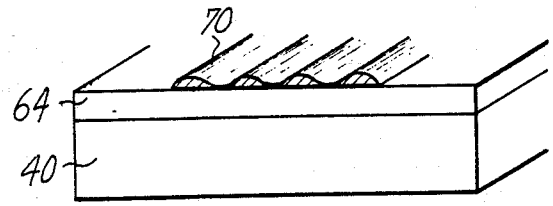
(d)
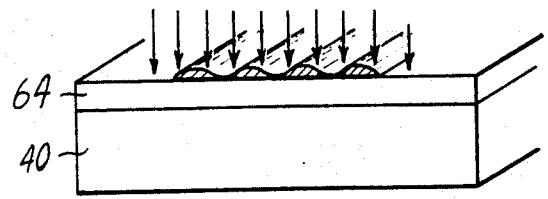
(e)
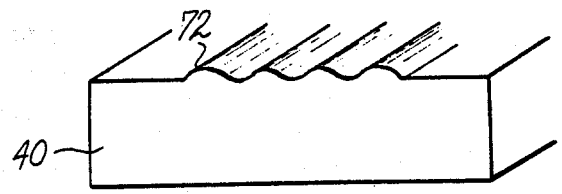
(f)

OPTICAL MONOMODE GUIDANCE STRUCTURE INCLUDING LOW RESOLUTION GRATING

This application is a continuation of application Ser. No. 612,316, filed on May 21, 1984, now abandoned.

FIELD OF THE INVENTION

The present invention relates to an optical guidance structure used in integrated optics.

BACKGROUND OF THE INVENTION

The structure according to the invention is similar to the Y-junction device diagrammatically shown in FIG. 1. Such a device comprises an optical input waveguide 10 of direction De, extended by two output guides 11 and 12 of directions $Ds_1$, $Ds_2$ which are respectively inclined by $+\alpha$ and $-\alpha$ with respect to the input guide direction De. The structure also comprises a widened zone 13 forming the junction between the input guide 10 and the output guides 11, 12. An optical beam entering the junction 13 by the input guide 10 is subdivided into two beams, which propagate into the two output guides 11, 12.

In order to better define the phenomena encountered in such a structure, consideration will be given hereinafter to two planes A and B perpendicular to the direction De, said planes defining a zone I to the left of A and which is that of the input guide 10, a zone II between A and B, which is that of the actual junction 13 and a zone IIII to the right of B, which is that of the output guides 11, 12. Moreover, C is the edge at which the two output guides 11, 12 meet. Such a Y-junction device has numerous applications in integrated optics, particularly in so-called Mach-Zender modulator constructions.

The properties of these devices are, for example, described in the article by I. ANDERSON, entitled "Transmission performance of Y-junctions in planar dielectric waveguides", published in the journal "IEE Proceedings of Microwaves Optics and Acoustics", 2, pp. 7 to 12, January 1978, as well as in the article by BAETS R and LAGASSE P. E., entitled "Calculation of radiation loss in integrated optics tapers and Y-junctions", published in the journal "Applied Optics" 21, 11, pp. 1972-1978 of June 1982.

This type of device suffers from three difficulties, which must be understood in order to appreciate the interest of the present invention. These difficulties are:

(a) the mode conversion in the junction region (region II), (b) the appearance of radiation in the junction angle (zone C), and (c) coupling between the two output guides (region III).

The mode conversion phenomenon is as follows. The input guide 10 and the output guides 11 and 12 are designed for monomode operation. This means that, for the operating waveguide length used, the width and thickness of the guides are such that only the fundamental propagation mode can be established. For a given thickness, the tolerance on the guide width is very small. If this width is excessive, higher order modes will be able to propagate. This is precisely what takes place in zone II of the device, where junction 13 has a widened shape, whose width increases constantly between plane A and plane B. Thus, the condition of maintaining the lowest mode is not respected in this zone, and higher order modes can appear. The diffraction of light in plane A is combined with the aforementioned phenomenon to increase this mode conversion. Thus, in this plane, the guide has a break. In plane A, the propagation vector along De in zone I has an angular dispersion. Accordingly, following A, the propagation vector will no longer be directed along De in the whole cross-sectional plane, the vector being obliquely directed on the edges.

These two phenomena combine to break the monomode character of the structure and bring about the mode conversion. As, by design, output guides 11 and 12 are monomodal, there will be incompatibility between the multimode wave front which reaches these guides in plane B and the monomode wave front able to propagate in the two output guides. Thus, part of the input light energy will be dispersed in the region of plane B.

The second difficulty encountered in junctions of this type is the appearance of radiation in angle C. The quasi-spherical front of the wave propagating from plane A to plane B in region II strikes edge C, where a diffraction wave is formed, whose centre is the said edge. This wave radiates throughout the device, including towards the waveguide. Only a small part of this diffracted wave satisfies the conditions permitting the propagation in the output guides, the remainder being diffused and lost.

The final difficulty concerns the proximity of the output guides in region III, which has the effect of coupling the guides to one another causing (as in the directional coupler where this effect is used) the transfer of energy from one guide to the other. This transfer has a quasi-periodicity on moving away from plane B. The smaller the value of the angular aperture ($2\alpha$), the more marked this effect. However, in the Y-junctions, this angle is necessarily small (only a few degrees) if it is wished to obtain a good energy transfer from the input guide to the output guides, so that said coupling is important.

OBJECT AND BRIEF SUMMARY OF THE INVENTION

The object of the invention is to overcome all these difficulties. This object is achieved by the use of a diffraction grating positioned between the input guide and the junction, the spacing of the grating only defining two diffraction directions having orders differing from zero and respectively $+1$ and $-1$. This spacing is also chosen so that these two diffraction directions coincide with the directions of the two output guides.

According to a preferred variant, the structure comprises a third monomode output guide located between the first two guides and having the same direction as that of the input guide, said third guide corresponding to diffraction order zero.

BRIEF DESCRIPTION OF THE DRAWINGS

The invention is described in greater detail hereinafter relative to non-limitative embodiments and with reference to the attached drawings:

FIG. 8 shows the diffusion mechanism (a) and the diffusion profile (b) obtained.

FIG. 9 shows the ion exchange mechanism (a) and the profile obtained (b).

FIG. 10 shows the different stages of a process for obtaining a grating guide by interferometry.

DETAILED DESCRIPTION OF THE INVENTION

Figure 1:
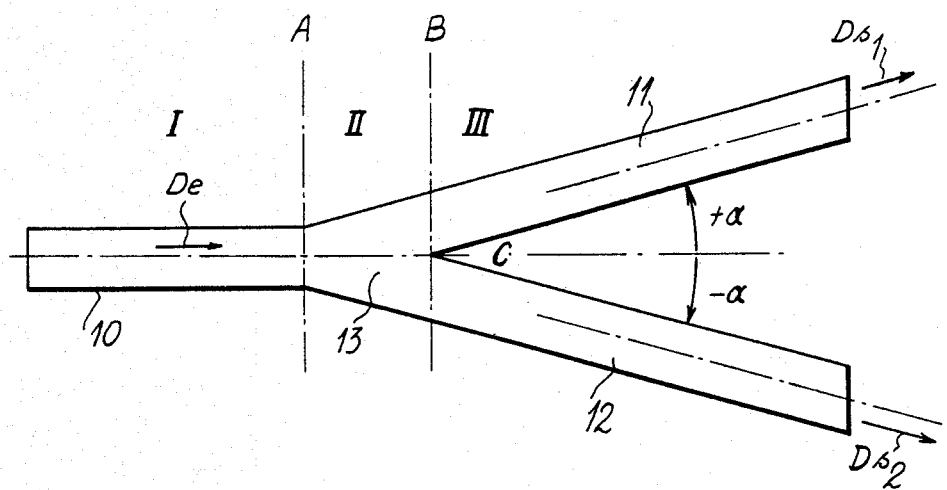
FIG. 1, already described, shows a prior art Y-junction.
Figure 2:
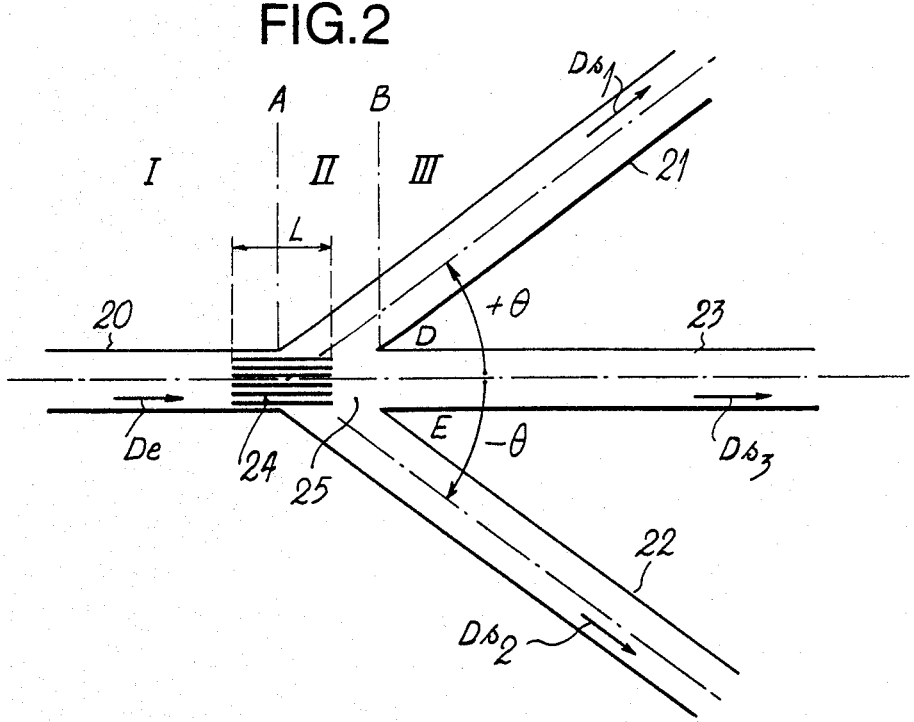
FIG. 2 shows an embodiment of a guidance structure according to the invention.

As shown in FIG. 2, the structure according to the invention comprises a monomode input guide 20 of direction De, two symmetrical monomode output guides 21, 22 of directions $Ds_1$ and $Ds_2$ inclined by $+\ominus$ and $-\ominus$ relative to direction De, and a third output guide 23 located in the extension of the input guide 20—i.e., having a direction $Ds_3$ coinciding with the direction De. The junction between the input guide 20 and the output guides 21, 22, and 23 is formed by a widened zone 25. The structure also comprises a low resolution diffraction grating 24, located partly in the downstream end of the input guide 20 and partly in the entrance to the junction 25. The diffraction grating 24 consists of a small number of lines having a spacing P.

It is generally known that, when a grating of spacing p is traversed by optical radiation of wavelength $\lambda$, diffracted beams of different orders m appear (m being a positive or negative integer) in directions $\phi$ defined by:

$$\sin \phi = m\lambda/np$$

n being the refraction index of the material.

In the case of the invention, use is made of a grating for which only the orders $+1$ and $-1$ exist, orders higher than 1 being excluded. This condition is satisfied by making the quantity $\lambda/np$ at least equal to 0.5. Thus, for such a value, any order m exceeding 1 will lead to a quantity $m\lambda/np$ exceeding 1, for which there is no real value of the angle $\phi$.

Thus, for a given wavelength, a spacing p below $2\lambda/n$ will be chosen—e.g., $\lambda=1.55$ $\mu$m and $n=3.3$, the spacing will be of the order of one micron.

The directions of the beams of order $+1$ and $-1$ then form angles $+\phi$ and $-\phi$ with the normal, the angle $\phi$ being defined by:

$$\sin \phi = \lambda/np.$$

The angle $\ominus$ of the directions $Ds_1$ and $Ds_2$ with direction De and the spacing p of the grating are then chosen so that $\phi$ is equal to $\ominus$. The direction of the beam of order 0 is that of the incident beam.

In other words, an incident beam following the input guide 20 gives rise, after passing through the grating 24, to three beams and to three only: a beam of order $+1$ following guide the 21, a beam of order $-1$ following the guide 22, and a beam of order 0 following the guide 23.

With regards to the energy distribution in the different output guides, it will be observed that, in conventional manner, the energy diffracted by a grating in orders $\pm 1$ is proportional to $J_1^2(x)$, in which $J_1$ is the Bessel function of order 1 and in which x is a parameter which is a function of the length L of the grating. For an index grating, where the index varies periodically by a quantity $\Delta n$, the parameter x is equal to $\pi \Delta n L/\lambda$. The energy corresponding to order 0 is proportional to $J_0^2(x)$, in which $J_0$ in the Bessel function of order 0. As a function of the values given to the grating length L (i.e., to the parameter X), it is possible to distribute the energy proportion in the guides in certain limits.

Figure 3:
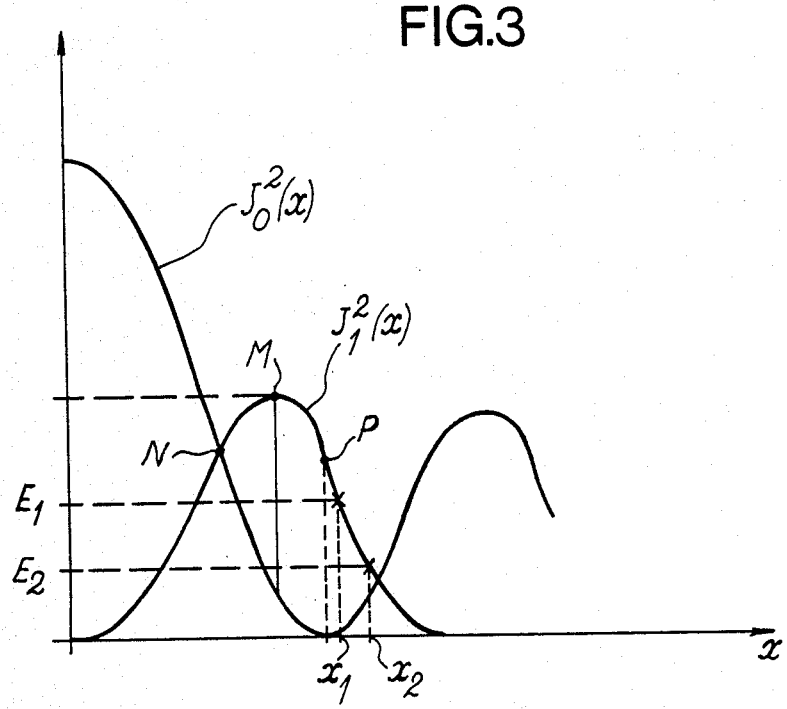
FIG. 3 illustrates the energy distribution in the modes of order 0 and 1.

This question can be defined with the aid of FIG. 3, in which the two curves $J_0^2(x)$ and $J_1^2(x)$ are diagrammatically plotted. The operating point M corresponds to an energy maxium in orders $\pm 1$, the energy in mode 0 not being zero. Point N corresponds to an energy equality in the three modes. Point P, for which $J_0^2(x)=0$, corresponds to the absence of energy in order 0, in which case there is no need for the third guide 23, the diffracted energy being concentrated only in the two guides 21 and 22. However, in general, use will be made of this third guide for various purposes—e.g., for a detection, for a feedback, etc.

Figure 4:
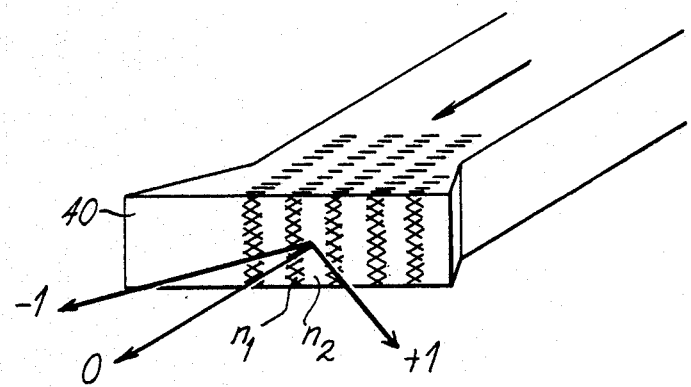
FIG. 4 shows diagrammatically a section through the structure using an index grating.
Figure 5:
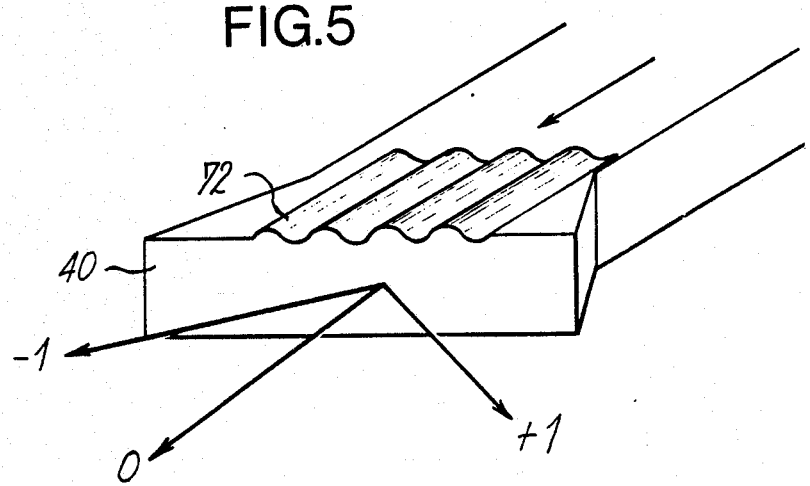
FIG. 5 shows diagrammatically a section through the structure using an undulation grating.

FIGS. 4 and 5 diagrammatically show the arrangement of the grating in the case of an index grating (FIG. 4) and in that of an undulation or corrugation grating (FIG. 5).

The index grating of FIG. 4 is formed by index portions $n_1$ and $n_2$, which alternate in a periodic manner. The index variations can be obtained by diffusion, as will be shown hereafter.

The undulation grating of FIG. 5 comprises an undulated structure 72, which leads to a periodic variation of the effective thickness of the optical guide. It is known that the effective thickness of a waveguide is equal to the sum of three terms: the geometrical thickness of the guide, the depth within the substrate at which the amplitude of the guided wave drops to 1/e of its value, and the distance in the superstrate in which the amplitude of the guided wave drops to 1/e of its value. With a structure like that of FIG. 5, where the optical guide thickness varies periodically, the effective thickness of the guide also varies periodically. This periodicity in the propagation conditions creates the diffraction grating.

In an undulation grating, the effect thereof is limited to the area of the guide in the vicinity of the corrugated surface and does not extend to the complete guide. In an index grating (FIG. 4), the different index zones can affect the complete optical guide. Thus, the efficiency of a corrugated grating is generally less than that of an index grating. This weakness will be compensated by giving the grating a greater length.

The advantages of the invention are obvious. As a result of the presence of the diffraction grating, the wave vector of the incident radiation which dictates the propagation of the wave is modified to wave vectors adapted to the directions of the output guides. Thus, the optimization of the energy transfer is obtained, which was not the case in the prior art. Thus, the losses by diffraction in corners D and E are reduced.

The following comments are made on the mode conversion phenomenon. The grating used has a low wavelength resolution, because it comprises small numbers of "lines". Thus, as stated hereinbefore, the spacing of the grating is approximately 1 microns, whereas the width of the waveguide is approximately 8 to 10 $\mu$m. Thus, the grating has no more then about 10 lines. The low resolution resulting from this means that the energy of a high order load, as results from the aforementioned conversion phenomenon, will be diffracted towards the two guides 21, 22 with a very small angular variation compared with the fundamental mode. Therefore, the losses due to mode conversion are reduced compared with the prior art.

Moreover, it is alway possible to change the shape of the grating to improve the energy distribution. For example, the different zones of the grating can be given different lengths— e.g., short on the edges of the guide and long in the centre.

Finally, the angular aperture $2\gamma$ can be large (e.g., several dozen degrees), which considerably reduces the coupling phenomena between the output guides. Thus, the disadvantages referred to hereinbefore are obviated.

Figure 6:
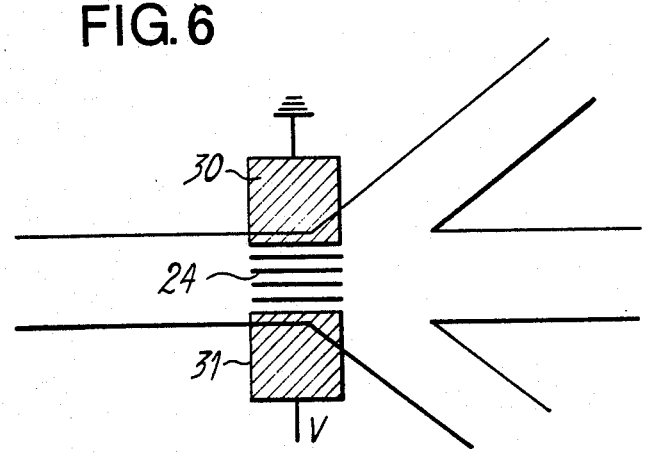
FIG. 6 shows a variant in which there is an electro-optical modulation.

The structure described hereinbefore can be made from materials having a high electrooptical coefficient ($LiNbO_3$, InP, GaAs, etc). Electrodes can then be positioned in the vicinity of the junction to obtain a modulation of the light. The phenomenon involved is slightly different from that of conventional modulators. It can be explained with the aid of FIG. 3 and FIG. 6, which shows an index diffraction grating 24 inserted between two electrodes 30, 31. The electrode 30 is connected to earth, and the electrode 31 is raised to a regulatable voltage V. The electrical field applied to the electrooptical material forming the index diffraction grating 24 modifies the indices $n_1$ and $n_2$ of the different zones of the grating (i.e., causes a variation in $\Delta n$) and therefore the parameter x referred to hereinbefore. If the voltage V applied is modulated between two values $V_1$ and $V_2$, this is equivalent to a variation of x between two values $x_1$ and $x_2$. On referring to FIG. 3, it is possible to see that the energy diffracted in orders $+1$ and $-1$ then varies between two values $E_1$ and $E_2$. Thus, there is a light modulation in the two output guides 21, 22 (and naturally in the third output guide 23).

The following numerical values are given in an exemplified manner:
energy distribution: 34% in the two output guides 21, 22 and 8% in the central output guide 23, with $x=1.9$, which essentially corresponds to point M of FIG. 3;
equal distribution in the three output guides (point N) with x approximately 1.4 to 1.5;
with a $Ti:LiNbO_3$ guide of width 8 $\mu$m, $\Theta=30°$ at the wavelength 1.55 $\mu$m, the grating spacing p being 1.4 $\mu$m and the length L being equal to 78 $\mu$m, the parameter x being equal to 1.9;
for $\Theta=45°$, $\lambda=1.55$ $\mu$m, $p=1.0$ $\mu$m, and $1=60$ $\mu$m, the parameter x is equal to 1.45.

With regards to the manufacture of the device described hereinbefore, it is possible to use known processes, like those described in the article by PUN E. Y. B. and YI-YAN Alfredo entitled "Fabrication of Periodic Waveguides by Ion Exchange", published in "Applied Physics Letters", 38, 9, pp. 837-874, May 1981, as well as in the article by PUN E. Y. B., WONG K. K., ANDONOVIC I., LAYBOURN P. J. R and DE LE RUE R. M. entitled "Efficient Waveguide Bragg-Deflection Grating on $LiNbO_3$", published in Electronics Letters, 18, 17, pp. 740-742, August 1982.

FIGS. 7 to 10 show several stages and possible production processes.

Figure 7:
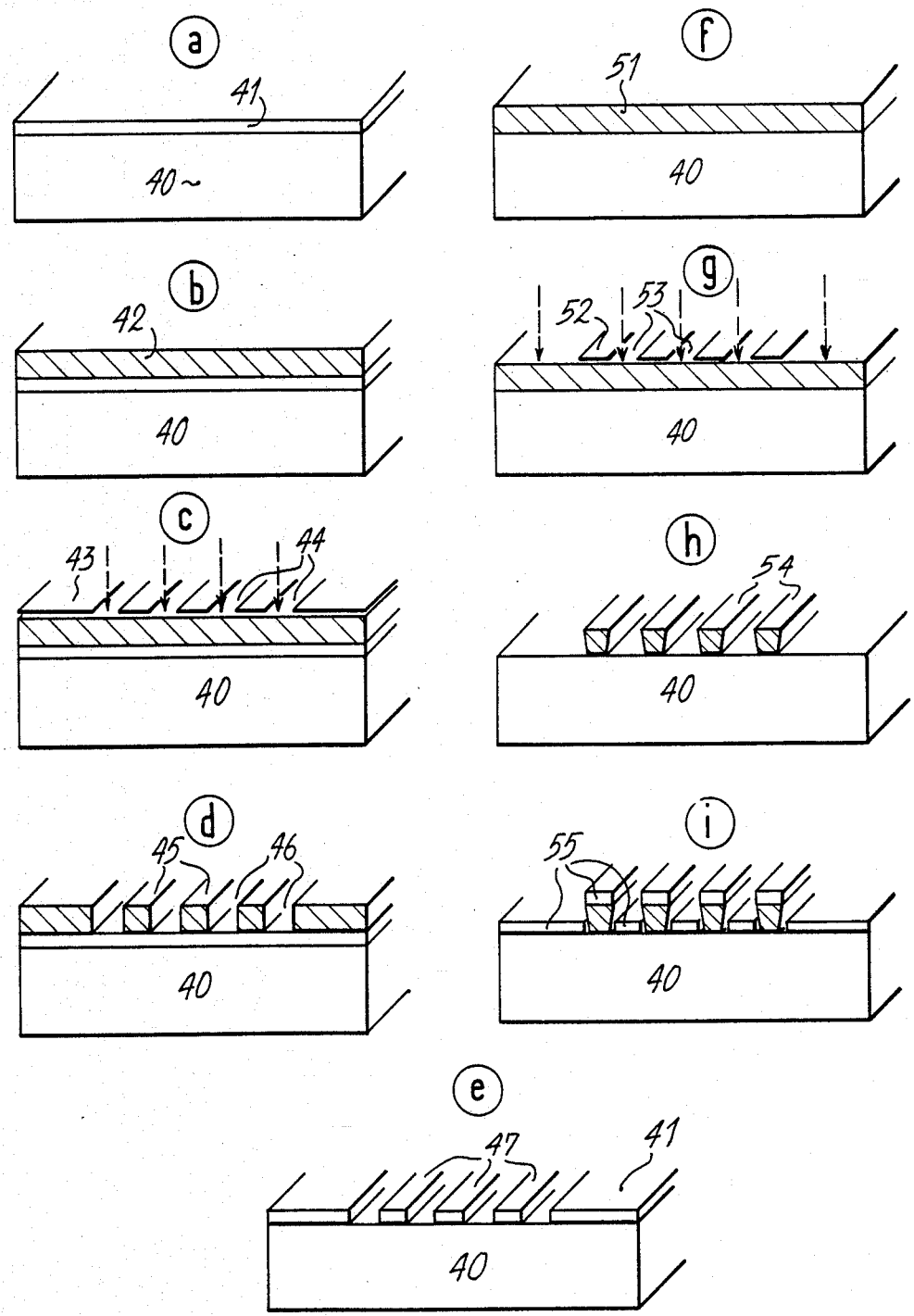
FIGS. 7(a)–(e) shows different stages in a process for producing pattern permitting the formation of a grating.

Firstly, in FIG. 7, onto a substrate 40 is deposited a dopant material layer 41 (FIG. a) and then a photoresin layer 42 (FIG. b). The photoresin layer 42 which is irradiated (FIG. c) through a mask 43 containing openings 44. After development, resin strips 45 are left, which are separated by openings 46 (FIG. d). Ion or chemical etching of dopant material layer 41 takes place through these openings. Finally, the resin strips 45 are removed, which leaves behind dopant strips 47 on the substrate 40 (FIG. e).

Another process leading to the same result consists of depositing a photoresin layer 51 (FIG. f) on the substrate 40 and irradiating the photoresin layer 51 through a mask 52 having openings 53 (FIG. g). The resin strips 54 (FIG. h) are left behind after development. This is followed by the deposition of a metallic layer 55 (FIG. i) and then by lift-off of those parts of the metal layer covering the resin strips. This leads to the pattern of FIG. e.

The process is continued in the manner indicated in FIG. 8 after obtaining the pattern of FIG. 7(e) in one or the other manner. The dopant strips 47 are then constituted by a dopant material, which is diffused into the substrate 40. This diffusion is essentially of a transverse nature, but also has a lateral part. This diffusion is diagrammatically indicated by the arrows of FIG. 8(a). Following diffusion, a continuous doping guidance layer 50, as illustrated in FIG. 8(b) is obtained.

Instead of using the diffusion of a dopant, it is possible to use an ion exchange process, as illustrated in FIG. 9. The zones 47' are then constituted by a mask, which covers the substrate. This substrate structure is the seat of an ion exchange on contacting with an ionic solution 54'. For example, $Na^+$ ions 56 from the glass substrate are exchanged with $Ag^{++}$ ions 58 from the ionic solution 54'. This exchange preferably takes place in a transverse direction but also in a lateral direction (indicated by the arrows in FIG. 9(a). As soon as the ion exchange is ended, the mask 47' is removed. The finally obtained guidance layer 60 is still continuous and is shown in FIG. 9(b). It is identical to that of FIG. 8b, except that now the effect obtained is maximum facing the mask openings whereas, in the preceding case, the diffusion was minimum there. In both cases, the guidance layer 50 or 60 or its substrate 40 is subject to a periodic index variation.

FIG. 10 illustrates a final production process. A photoresin layer 66 (FIG. 10(b)) is deposited on the substrate 40 coated with a guidance layer 64 (FIG. 10(a)). The guidance layer 66 is irradiated by two coherent rays 67 and 68, which interfere on the photoresin layer 66 (Fig. 10(c)). The thus obtained interference fringes make it possible, after development, to obtain a photoresin layer 70 of periodic thickness (FIG. 10(d)). By ionic machining through the photoresin layer 70 (FIG. 10(e)), the undulating guidance layer 72 surmounting the substrate 40 is obtained.

What is claimed is:
1. An optical guidance structure comprising:
(a) a monomode input guide having a particular direction (De);
(b) two monomode output guides having directions ($Ds_1$, $Ds_2$) symmetrically inclined with respect to the direction (De) of said monomode input guide;
(c) a widened junction zone between said monomode input guide and said two monomode output guides; and
(d) a low resolution diffraction grating located partly in said monomode input guide and partly in said widened junction zone, said low resolution diffraction grating having lines extending along the direction (De) of said monomode input guide, said lines having a length and a spacing which defines only two diffraction directions of orders differing from zero by, respectively, +1 and −1, said spacing being chosen so that said two diffraction directions coincide with the directions ($D_{s1}$, $D_{s2}$) of said two monomode output guides.

2. An optical guidance structure according to claim 1 and further comprising a third monomode output guide located between said two monomode output guides and having the same direction as that of said monomode input guide.

3. An optical guidance structure according to claim 1 wherein said low resolution diffraction grating is formed by two electrodes raised to different potentials.

4. An optical guidance structure according to claim 1 wherein said grating is an index grating.

5. An optical guidance structure according to claim 1 wherein said grating is obtained by undulation of the thickness of the guidance layer.

6. An optical guidance structure according to claim 1, wherein the lines of said low resolution diffraction grating have different lengths.

7. An optical guidance structure according to claim 6, wherein the lines of said low resolution diffraction grating are shorter on the edges of said low resolution diffraction grating than in the center.

8. An optical guidance structure according to claim 1, wherein the lines of said low resolution diffraction grating have the same lengths.

9. An optical guidance structure according to claim 1, wherein said low resolution diffraction grating has no more than about 10 lines.

10. An optical guidance structure according to claim 1, wherein the angular aperture between said two monomode output guides is on the order of several dozen degrees, thereby reducing coupling between said two monomode output guides.

11. An optical guidance structure according to claim 1, wherein:
(a) the spacing of the lines in said low resolution diffraction grating is approximately 1 micron and
(b) the width of said monomode input guide is approximatetly 8–10 microns,
whereby said low resolution diffraction grating has no more than about 10 lines.

* * * * *